United States Patent
Amsterdam et al.

(10) Patent No.: US 9,106,969 B2
(45) Date of Patent: *Aug. 11, 2015

(54) FILTERING

(71) Applicant: International Business Machines Corporation, Armonk, NY (US)

(72) Inventors: Jeffrey D. Amsterdam, Marietta, GA (US); Randy S. Johnson, Fallon, MO (US); David W. Morgan, Atlanta, GA (US); Tedrick N. Northway, Wood River, IL (US)

(73) Assignee: International Business Machines Corporation, Armonk, NY (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/928,473

(22) Filed: Jun. 27, 2013

(65) Prior Publication Data

US 2013/0298157 A1 Nov. 7, 2013

Related U.S. Application Data

(63) Continuation of application No. 12/781,871, filed on May 18, 2010, now Pat. No. 8,510,772.

(51) Int. Cl.
*H04N 21/488* (2011.01)
*G08B 13/196* (2006.01)
*G08B 31/00* (2006.01)

(52) U.S. Cl.
CPC ...... *H04N 21/4882* (2013.01); *G08B 13/19693* (2013.01); *G08B 31/00* (2013.01)

(58) Field of Classification Search
None
See application file for complete search history.

(56) References Cited

U.S. PATENT DOCUMENTS

| | | | |
|---|---|---|---|
| 7,159,230 B2 * | 1/2007 | Manson et al. | 725/33 |
| 7,340,457 B1 | 3/2008 | Killian et al. | |
| 7,681,215 B2 * | 3/2010 | Kim | 725/33 |
| 8,510,772 B2 | 8/2013 | Amsterdam et al. | |
| 2002/0124252 A1 * | 9/2002 | Schaefer et al. | 725/33 |
| 2005/0162267 A1 * | 7/2005 | Khandelwal et al. | 340/506 |
| 2005/0204381 A1 | 9/2005 | Ludvig et al. | |
| 2006/0174282 A1 | 8/2006 | Dennison et al. | |
| 2007/0288964 A1 | 12/2007 | Horiguchi et al. | |
| 2008/0288985 A1 | 11/2008 | Verhaegh et al. | |
| 2009/0164448 A1 | 6/2009 | Curtis et al. | |
| 2009/0199241 A1 | 8/2009 | Unger et al. | |
| 2009/0235305 A1 | 9/2009 | Pugel et al. | |
| 2011/0285542 A1 | 11/2011 | Amsterdam et al. | |

OTHER PUBLICATIONS

Bais et al.; Customized Television: Standards Compliant Advanced Digital Television; IEE Transactions on Broadcasting, vol. 48, No. 2, Jun. 2002; 0018-9316/02 copyright 2002 IEEE; pp. 151-158.

(Continued)

*Primary Examiner* — Cai Chen
(74) *Attorney, Agent, or Firm* — Schmeiser, Olsen & Watts; Matthew Chung

(57) ABSTRACT

An alert generation method and system. The method includes receiving by a computer processor, alert data indicating filters for specified alert types associated with possible future events. The computer processor receives monitor definition data and media generated audio/video data; compares the alert data to the media generated audio/video data; determines a first alert type matches first audio/video data of the media generated audio/video data; and determines that the first audio/video data comprises a primary event. The computer processor broadcasts the primary event.

20 Claims, 3 Drawing Sheets

(56) References Cited

OTHER PUBLICATIONS

Hongguang Zhang; Personalized TV Program Recommendation based on TV-Anytime Metadata; 0-7803-8920-04/05 copyright IEEE; downloaded by USPTO on Feb. 17, 2010; pp. 242-246.

Notice of Allowance (Mail Date Apr. 8, 2013) for U.S. Appl. No. 12/781,871, filed May 18, 2010; Confirmation No. 3576.

* cited by examiner

FILTERING

This application is a continuation application claiming priority to Ser. No. 12/781,871 filed May 18, 2010, now U.S. Pat. No. 8,510,772 issued Aug. 13, 2013.

FIELD

The present invention relates to a method and associated system for generating and filtering alerts.

BACKGROUND

Providing informational data for analysis typically comprises an inefficient process with little flexibility. Random data streams are typically used for providing the informational data. Using random data streams for providing the informational data may result in similar data streams being provided for analysis.

SUMMARY

The present invention provides a method comprising: receiving, by a computer processor of an alert generation computing system from a user, alert data indicating filters for specified alert types associated with possible future events, wherein the specified alert types comprise primary alert types and secondary alert types; saving, by the computer processor, the alert data; receiving, by the computer processor, monitor definition data indicating primary audio/video monitors and secondary audio/video monitors for broadcasting primary and secondary audio/video data associated with the alert data; receiving, by the computer processor from a plurality of media sources, media generated audio/video data associated with events currently occurring at different geographical locations; first comparing, by the computer processor, the alert data to a first portion of the media generated audio/video data; first determining, by the computer processor based on results of the first comparing, that a first alert type of the specified alert types matches first audio/video data of the first portion of the media generated audio/video data; second determining, by the computer processor based on the results of the first comparing and the monitor definition data, that the first audio/video data comprises a primary event; transmitting, by the computer processor to the user, a first notice indicating that the first alert type matches the first audio/video data and that the first audio/video data comprises a primary event; and broadcasting, by the computer processor for the user on a first primary audio/video monitor of the primary audio/video monitors, the first audio/video data.

The present invention provides a computing system comprising a computer processor coupled to a computer-readable memory unit, the memory unit comprising instructions that when enabled by the computer processor implement an alert generation method comprising: receiving, by the computer processor of an alert generation computing system from a user, alert data indicating filters for specified alert types associated with possible future events, wherein the specified alert types comprise primary alert types and secondary alert types; saving, by the computer processor, the alert data; receiving, by the computer processor, monitor definition data indicating primary audio/video monitors and secondary audio/video monitors for broadcasting primary and secondary audio/video data associated with the alert data; receiving, by the computer processor from a plurality of media sources, media generated audio/video data associated with events currently occurring at different geographical locations; first comparing, by the computer processor, the alert data to a first portion of the media generated audio/video data; first determining, by the computer processor based on results of the first comparing, that a first alert type of the specified alert types matches first audio/video data of the first portion of the media generated audio/video data; second determining, by the computer processor based on the results of the first comparing and the monitor definition data, that the first audio/video data comprises a primary event; transmitting, by the computer processor to the user, a first notice indicating that the first alert type matches the first audio/video data and that the first audio/video data comprises a primary event; and broadcasting, by the computer processor for the user on a first primary audio/video monitor of the primary audio/video monitors, the first audio/video data.

The present invention advantageously provides a simple method and associated system capable of providing informational data for analysis.

DETAILED DESCRIPTION

Figure 1:
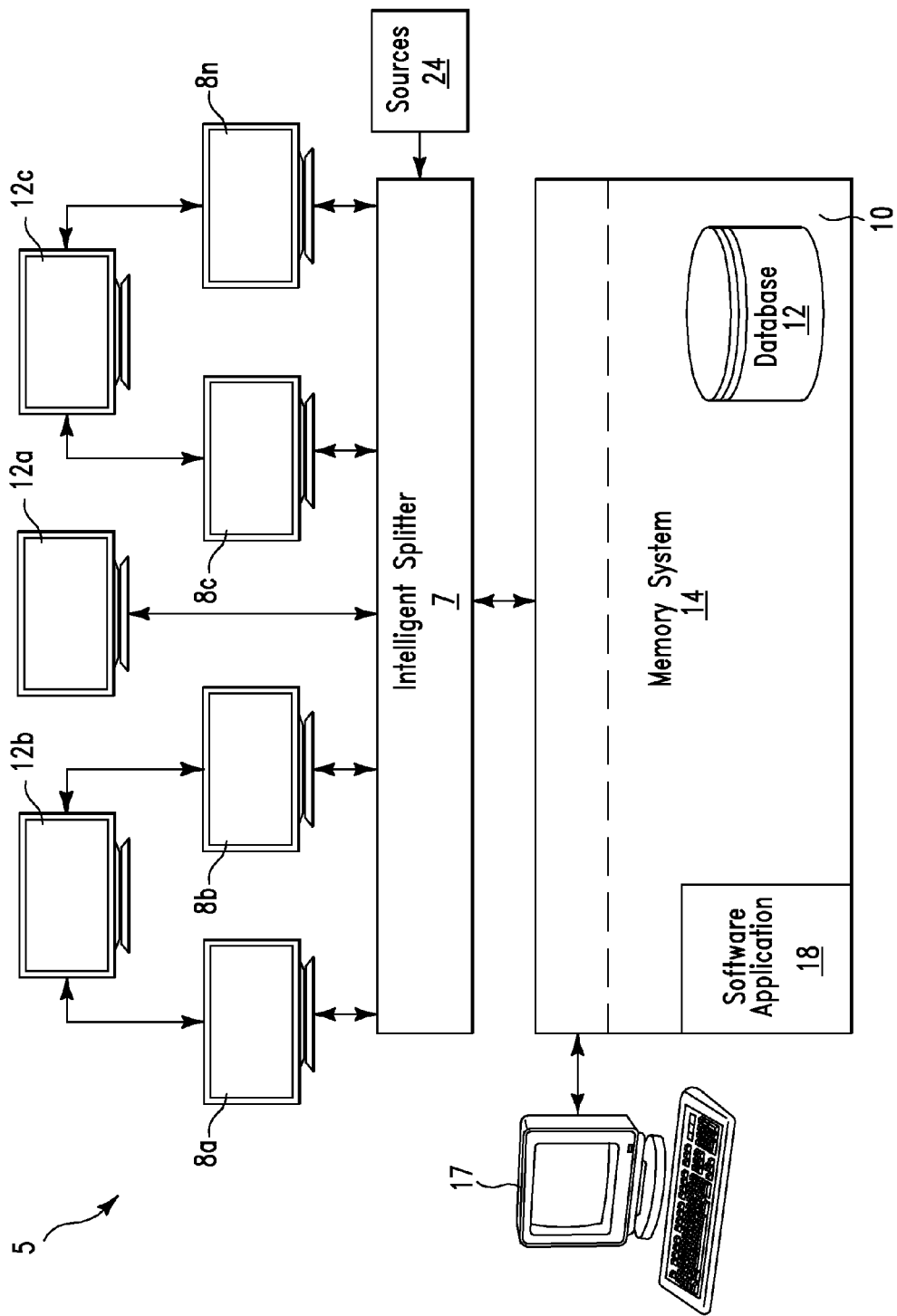
FIG. 1 illustrates a system for intelligently filtering media generated audio/video data streams between audio/video monitors, in accordance with embodiments of the present invention.

FIG. 1 illustrates a system 5 for intelligently filtering media generated audio/video data streams between audio/video monitors 12a, 12b, 12c, and 8a . . . 8n, in accordance with embodiments of the present invention. System 5 enables entities (e.g., companies, organizations, government agencies, etc) to intelligently filter broadcasted audio/video data (i.e., broadcasted by sources 24 such as, inter alia, cable feeds, satellite feeds, internet feeds, etc) associated with various major current events in order to determine any potential impact to the entities. System 5 enables multiple audio/video displays (e.g., (audio/video) monitors 12a, 12b, 12c, and 8a . . . 8n in FIG. 1) to detect (i.e., via a computing system 10 and an intelligent splitter 7) broadcasts (i.e., comprising breaking news alerts and/or major news stories) from a broadcaster (e.g., a television network) and evaluate additional broadcasts (e.g., from additional television networks) to determine if another broadcaster is broadcasting a same broadcast. If a same broadcast is detected, system 5 captures the additional broadcasts and monitors audio/video data (associated with the additional broadcasts) to obtain the most recent information. Additionally, system 5 provides textual alert data on a focus (primary) monitor 12a. The textual alert data indicates that a first broadcaster is receiving data/interview with a reliable source. The textual alert data enables a security department to command 5 system to move the broadcast (i.e., from the first broadcaster) to focus monitor 12a in order to view/listen to broadcast. Note that focus monitor 12a continues to reports any text updates so that additional primary broadcasts may be selected for viewing.

System 5 of FIG. 1 comprises (audio/video) monitors 12*a*, 12*b*, 12*c*, and 8*a* . . . 8*n* and audio/video sources 24 connected through an intelligent splitter 7 to a computing system 10. Additionally, system 5 comprises a computer terminal 17 (i.e. for defining alerts types as described, infra) connected to computing system 10. Audio/video monitors 8*a* . . . 8*n* comprise monitors for randomly broadcasting multiple different programming media data (e.g., comprising news stories) from multiple different networks. Audio/video monitor 12*a* comprises a monitor for diverting (i.e., by computing system 10 and intelligent splitter 7) a main (major) news broadcast associated with major current event (as designated by an alert data matching process as described, infra). Audio/video monitors 12*b* and 12*c* comprise monitors for diverting (i.e., by computing system 10 and intelligent splitter 7) secondary (i.e., as associated with the main major news broadcast on audio/video monitor 12*a*) major news broadcasts associated with major current events (as designated by an alert data matching process as described, infra). Intelligent splitter 7 comprises a device for intelligently routing different broadcasts to audio/video monitors 12*a*, 12*b*, 12*c*, and 8*a* . . . 8*n* based on specified alert data and commands from computing system 10. Intelligent splitter 7 may comprise a microprocessor and associated circuitry capable of intelligently routing different broadcasts to audio/video monitors 12*a*, 12*b*, 12*c*, and 8*a* . . . 8*n*. Audio/video monitors 12*a*, 12*b*, 12*c* may comprise focus monitors (for broadcasting filtered primary event related audio/video data) while audio/video monitors 8*a* . . . 8*n* comprise secondary monitors (for broadcasting or routing secondary event related audio/video data to the focus monitors). Computing system 10 may comprise any type of computing system(s) including, inter alia, a personal computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises alert data (i.e., used to route the broadcasts) and any records or reports associated with the broadcasts.

System 5 is enabled to capture broadcasts (i.e., associated with significant current events) that entities such as, inter alia, security services, homeland security, defense contractors, etc are required to be informed of as soon as the event occurs. System 5 comprises a programmable filtering system which permits users (i.e., of the entities) of system 5 to define the desired alert types (e.g., via terminal 17). For example, a user may define alert types associated with events such as, inter alia, explosions, weather types, national security issues, law enforcement issues, events that signal potential hazards that may lead to an incident impacting an environment being monitored/protected, etc. Intelligent splitter 7 permits a broadcast associated with a detected alert to be automatically diverted to focus monitor 12*a*. System 5 filters and presents relevant audio/video data from national and international sources in an organized manner that reduces redundant broadcasts and permits a user to dynamically define audio/video data viewing. System 5 enables the following process:

1. System 5 receives input alert data that meets defined monitoring criteria.
2. Event related audio/video data is presented to focus monitor 12*a* in accordance with the input alert data. In the event that an event related second broadcast from an affiliate is broadcasting a same audio/video data (a same audio/video data as being presented on focus monitor 12*a*), a user is notified. In response, the user may elect to display the same audio/video data on another focus monitor or the user may elect to ignore the same audio/video data. In the event of another non-related event occurs (broadcast by another source), system 5 notifies the user and the user may identify another of audio/video monitors 12*b* or 12*c* which may become designated as a second focus monitor which continues to provide audio/video data related to that event. The aforementioned process enables system 5 to filter audio/video data from affiliates that are broadcasting a same audio/video data so that a user will not receive a same alert for a same broadcast. Additionally, other broadcasting agencies (e.g., non affiliates) broadcasting a same audio/video data are filtered so that a user may determine if same audio/video data should be additionally monitored. Multiple non related events meeting a defined criteria may be recognized and a notification may be transmitted to a user so that additional threats are not ignored and may be monitored as desired/required.

Software application 18 enables a method for filtering audio/video data as follows:

1. Alerts types are defined and/or cleared from computing system 10. Upon an initial start up, a user defines and stores all entire alert types to identify and report. Additionally, the user may clear specified alert types (from computing system 10) once the incident or event is over or there is no potential danger. The user may additionally request that computing system 10 be reset and look for any new alert types. Additionally, system 5 may also be deactivated for any reason such as, inter alia, preventative maintenance or to completely shut down for a special requirement.
2. Alert data defining the alert types defined in step 1 is received (via terminal 17) and stored by computing system 10.
3. Monitor types are user defined. A user defines focus monitors (e.g., focus monitors 12*a*, 12*b*, and 12*c*) based on any user defined criteria. For example in FIG. 1, monitor 12*a* is defined as a primary focus monitor and monitors 12*b* and 12*c* are defined as secondary focus monitors. Additionally, the user may also define a number of display windows to be enabled within each of focus monitors 12*a*, 12*b*, and 12*c*. As an example, focus monitor 12*a* may be defined with six windows while focus monitor 12*b* is defined with four windows. Additional monitors (e.g., monitors 8*a* . . . 8*n*) may be identified as secondary monitors that may be tuned to a specific news station and/or defined as open where several windowed services may be displayed. In the event that a major event is being covered by several agencies or if another unrelated event has occurred, the event where multiple agencies have consumed all of available (defined) monitors may cause the user to dynamically redefine the monitors.
4. Computing system 10 receives and saves audio/video data monitor data as per the defined routing of the audio/video data to defined monitors.
5. Computing system 10 monitors and filters incoming audio/video data associated with broadcasts (from sources 24) in accordance with the alert data received in step 2. Computing system 10 filters the audio/video data to continually search for defined alerts. If computing system 10 locates an alert, software application 18 continues to look for additional and/or new alert data. Broadcasted audio/video data from cable sources, satellite sources, Internet sources, etc. are transmitted to computing system via intelligent splitter 7.

A. If additional and/or new alert data (i.e., comprising one or multiple alerts) is located, software application 18 will continue to review all audio/video data received and determine if any of the audio/video data received includes an alert message or a breaking news identifier.

B. Software application 18 determines if the additional and/or new alert data includes a repeat alert. If a repeat alert is detected, then software application 18 determines if the repeat alert is being broadcasted by an affiliate broadcasting the same information.

6. Computing system 10 locates an alert and determines that audio/video data associated with the alert may be displayed and notifies a user.
7. Computing system 10 displays the audio/video data associated with the alert on a primary or secondary monitor depending on the type of alert.

Figure 2:
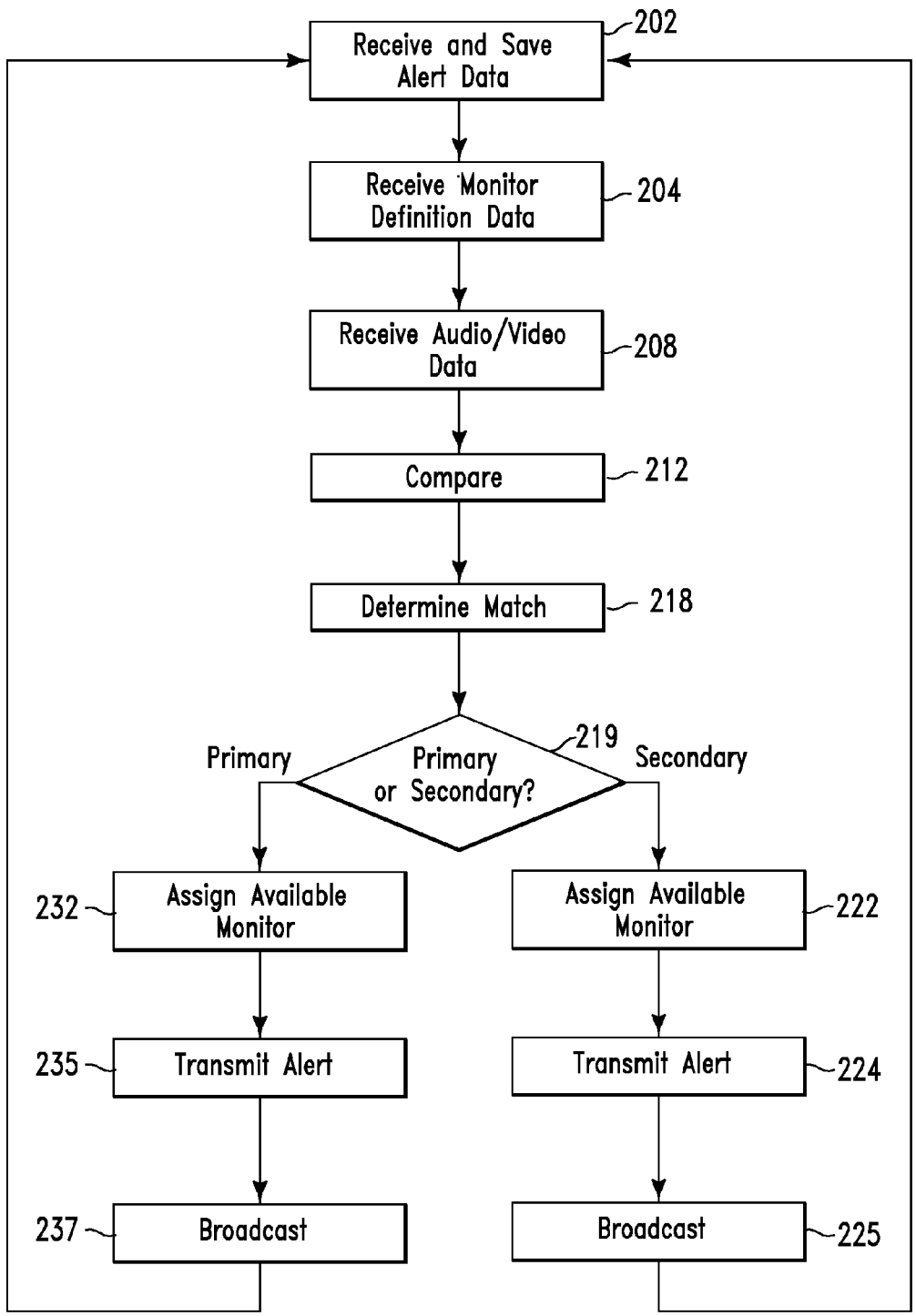
FIG. 2 illustrates a flowchart describing an algorithm used by the system of FIG. 1 for intelligently filtering media generated audio/video data streams between audio/video monitors, in accordance with embodiments of the present invention.

FIG. 2 illustrates a flowchart describing an algorithm used by system 5 of FIG. 1 for intelligently filtering media generated audio/video data streams between audio/video monitors, in accordance with embodiments of the present invention. In step 202, a computer processor of an alert generation computing system (e.g., computing system 10 of FIG. 1) receives (from a user) and saves alert data indicating filters for specified alert types (e.g., national security related, law enforcement related, disaster related, weather related, etc) associated with possible future events that may take place. The specified alert types may comprise primary alert types and secondary alert types. Primary alert types comprise alerts of high importance. For example, primary alert types may comprise national security related alerts associated with events related to national security threats. Secondary alert types comprise alerts of secondary importance with respect to primary alert types. For example, secondary alert types may comprise minor weather related alerts associated with events related to minor weather events. In step 204, the computer processor receives monitor definition data (e.g., from the user) indicating primary audio/video monitors (i.e., for broadcasting primary audio/video data associated with the alert data) and secondary audio/video monitors (i.e., for broadcasting secondary audio/video data associated with the alert data). In step 208, the computer processor receives (e.g., from a plurality of media sources such as, inter alia, various television and/or radio networks) media generated audio/video data associated with events currently occurring at different geographical locations (e.g., different parts of the world). In step 212, the computer processor compares the alert data to a portion of the media generated audio/video data. In step 218, the computer processor (i.e., based on results of the comparison in step 212) determines that a first alert type of the specified alert types matches first audio/video data of the portion of the media generated audio/video data. Additionally, the computer processor determines that the first audio/video data does not include the same information as audio/video data currently being broadcasted by system 5. In step 219, the computer processor determines (i.e., based on said results of steps 212 and 218) if the first audio/video data is associated with a primary event or a secondary event.

If in step 219, the computer processor determines that the first audio/video data is associated with a primary event then in step 232, the computer processor assigns a monitor for broadcasting the primary event. The computer processor will assign the monitor based on the following process:

1. The computer processor will assign an available primary monitor for broadcasting the first audio/video data associated with the primary event.
2. If a primary monitor is not available (i.e., all primary monitors are in use) the computer processor may assign a portion of a primary monitor (e.g., split the viewing area between different primary audio/video data on the primary monitor) for broadcasting the first audio/video data associated with the primary event.
3. If a primary monitor (or portions of a primary monitor) is not available (i.e., all primary monitors are in use) the computer processor may assign a secondary monitor for broadcasting the first audio/video data associated with the primary event.
4. If a primary and secondary monitor (or portions of the monitors) is not available, the computer processor may command a primary monitor to toggle or alternate between the first audio/video data and additional audio video data associated with primary events. For example, the computer processor may command the primary monitor to broadcast the first audio/video data for a first specified time period and then broadcast the additional audio video data for a second specified time period commencing after the first specified time period.

In step 235, the computer processor transmits (to the user) a notice(s) indicating that the first alert type matches the first audio/video data and that the first audio/video data comprises a primary event. The notice may be transmitted via email or as a audio and/or video signal. In step 237, the computer processor broadcasts on an audio/video monitor assigned in step 232, the first audio/video data and step 202 is repeated to continue the monitoring process.

If in step 219, the computer processor determines that the first audio/video data is associated with a secondary event then in step 222, the computer processor assigns a monitor for broadcasting the secondary event. The computer processor will assign the monitor based on the following process:

1. The computer processor will assign an available secondary monitor for broadcasting the first audio/video data associated with the primary event.
2. If a secondary monitor is not available (i.e., all secondary monitors are in use) the computer processor may assign a portion of a secondary monitor (e.g., split the viewing area between different secondary audio/video data on the secondary monitor) for broadcasting the first audio/video data associated with the secondary event.
3. If a secondary monitor (or portions of a secondary monitor) is not available (i.e., all secondary monitors are in use) the computer processor may assign any other available monitor for broadcasting the first audio/video data associated with the secondary event.
4. If there are no monitors (or portions of the monitors) is not available, the computer processor may command a monitor to toggle or alternate between the first audio/video data and additional audio video data associated with event. For example, the computer processor may command monitor to broadcast the first audio/video data for a first specified time period and then broadcast the additional audio video data for a second specified time period commencing after the first specified time period.

In step 224, the computer processor transmits (to the user) a notice(s) indicating that the first alert type matches the first audio/video data and that the first audio/video data comprises a secondary event. The notice may be transmitted via email or as an audio and/or video signal. In step 225, the computer processor broadcasts on an audio/video monitor assigned in step 222, the first audio/video data and step 202 is repeated to continue the monitoring process.

Figure 3:
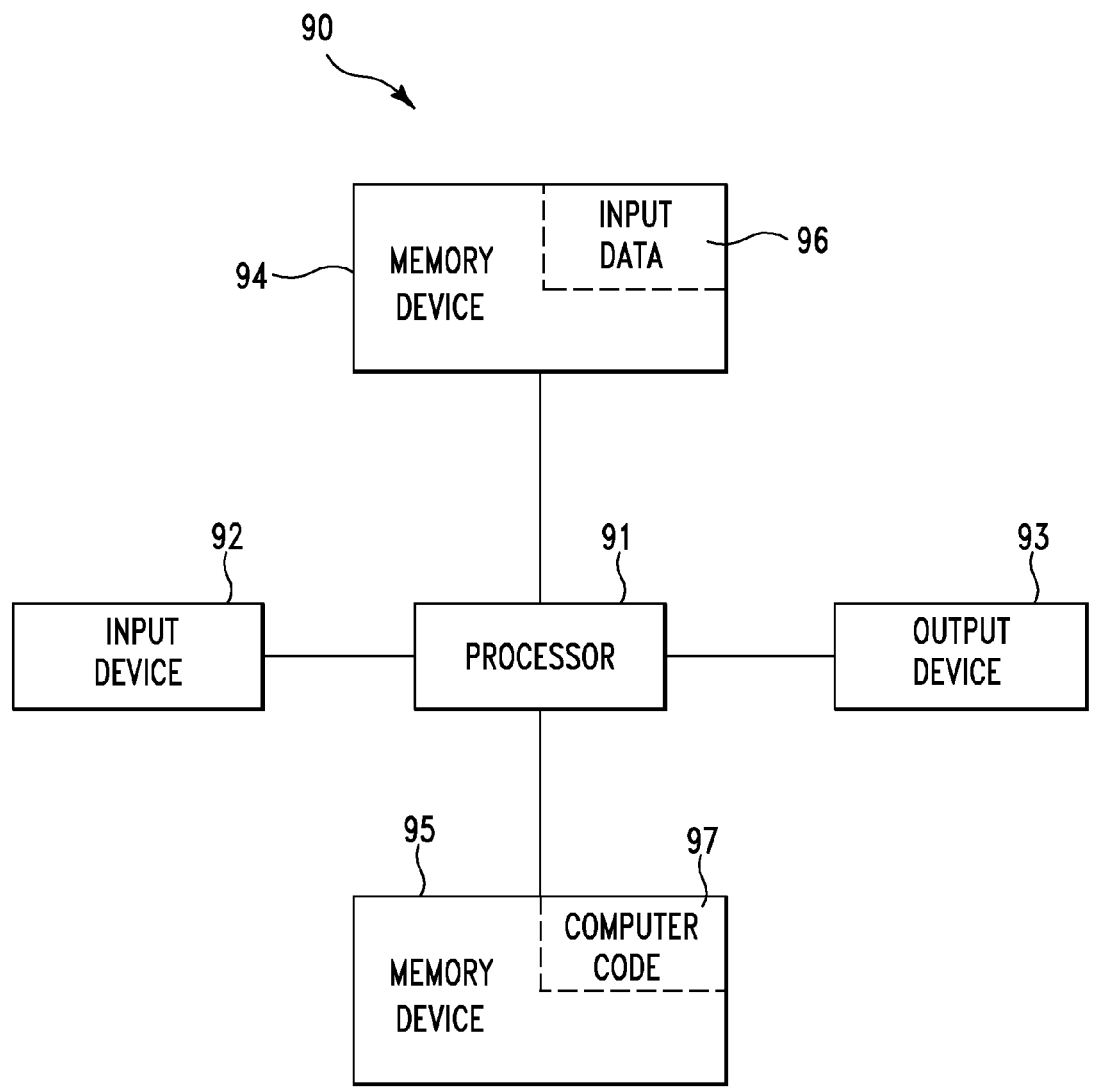
FIG. 3 illustrates a computer apparatus used for intelligently filtering media generated audio/video data streams between audio/video monitors, in accordance with embodiments of the present invention.

FIG. 3 illustrates a computer apparatus 90 (e.g., computing system 10 of FIG. 1) used for intelligently filtering media generated audio/video data streams between audio/video monitors, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for intelligently filtering media generated audio/video data streams between audio/video monitors. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to intelligently filter media generated audio/video data streams between audio/video monitors. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for intelligently filtering media generated audio/video data streams between audio/video monitors. In another embodiment, the invention provides a method that performs the process steps of the invention on a subscription, advertising, and/or fee basis. That is, a service provider, such as a Solution Integrator, could offer to intelligently filter media generated audio/video data streams between audio/video monitors. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
receiving, by a computer processor of an alert generation computing system from a user, alert data indicating filters for specified alert types associated with possible future events, wherein said specified alert types comprise primary alert types and secondary alert types;
receiving, by said computer processor, monitor definition data indicating primary audio/video monitors and secondary audio/video monitors for broadcasting primary and secondary audio/video data associated with said alert data;
receiving, by said computer processor from a plurality of media sources, media generated audio/video data associated with events currently occurring at different geographical locations;
first comparing, by said computer processor, said alert data to a first portion of said media generated audio/video data;
first determining, by said computer processor, that a first alert type of said specified alert types matches first audio/video data of said first portion of said media generated audio/video data;
second determining, by said computer processor, that said first audio/video data comprises a primary event;
transmitting, by said computer processor to said user, a first notice indicating that said first alert type matches said first audio/video data and that said first audio/video data comprises a primary event; and
broadcasting, by said computer processor for said user on a first primary audio/video monitor of said primary audio/video monitors, said first audio/video data.

2. The method of claim 1, further comprising:
second comparing, by said computer processor, said alert data to a second portion of said media generated audio/video data;
determining, by said computer processor based on results of said second comparing, that a second alert type of said specified alert types matches second audio/video data of said second portion of said media generated audio/video data;
determining, by said computer processor based on said results of said second comparing and said monitor definition data, that said second audio/video data comprises a secondary event;
transmitting, by said computer processor to said user, a second notice indicating that said second alert type matches said second audio/video data and that said second audio/video data comprises a secondary event; and
broadcasting, by said computer processor for said user on a first secondary audio/video monitor of said secondary audio/video monitors, said second audio/video data.

3. The method of claim 1, further comprising:
second comparing, by said computer processor, said alert data to a second portion of said media generated audio/video data;
determining, by said computer processor based on results of said second comparing, that said first alert type of said specified alert types matches second audio/video data of said second portion of said media generated audio/video data;
determining, by said computer processor based on said results of said second comparing, that said second audio/video data comprises similar content as said first audio/video data; and
disabling, by said computer processor, a broadcast of said second audio/video data.

4. The method of claim 3, further comprising:
determining, by said computer processor, that said second audio/video data comprises and said first audio/video data are provided from a same main source.

5. The method of claim 1, further comprising:
second comparing, by said computer processor, said alert data to a second portion of said media generated audio/video data;
determining, by said computer processor based on results of said second comparing, that said first alert type of said specified alert types matches second audio/video data of said second portion of said media generated audio/video data;
determining, by said computer processor based on said results of said second comparing and said monitor definition data, that said second audio/video data comprises similar content as said first audio/video data;
determining, by said computer processor based on said results of said second comparing, said monitor definition data, and results of said determining that said second audio/video data comprises similar content as said first audio/video data, that said second audio/video data comprises a secondary event;
transmitting, by said computer processor to said user, a second notice indicating that said second audio/video data comprises a secondary event; and
broadcasting, by said computer processor for said user on a first secondary audio/video monitor of said secondary audio/video monitors, said second audio/video data.

6. The method of claim 1, further comprising:
second comparing, by said computer processor, said alert data to a second portion of said media generated audio/video data;
determining, by said computer processor based on results of said second comparing, that a second alert type of said specified alert types matches second audio/video data of said second portion of said media generated audio/video data;
determining, by said computer processor based on said results of said second comparing and said monitor definition data, that said second audio/video data comprises a primary event;
transmitting, by said computer processor to said user, a second notice indicating that said second alert type matches said second audio/video data and that said second audio/video data comprises a primary event; and
broadcasting, by said computer processor for said user on a second primary audio/video monitor of said primary audio/video monitors, said second audio/video data.

7. The method of claim 1, further comprising:
second comparing, by said computer processor, said alert data to a second portion of said media generated audio/video data;
determining, by said computer processor based on results of said second comparing, that a second alert type of said specified alert types matches second audio/video data of said second portion of said media generated audio/video data;
determining, by said computer processor based on said results of said second comparing and said monitor definition data, that said second audio/video data comprises a primary event;
determining, by said computer processor, that there are not any available primary audio/video monitors;
transmitting, by said computer processor to said user, a second notice indicating that there are not any available primary audio/video monitors; and
receiving, by said computer processor from said user in response to said second notice, a command associated with said second notice.

8. The method of claim 7, further comprising:
broadcasting in response to said command, by said computer processor for said user on a first secondary audio/video monitor of said secondary audio/video monitors, said second audio/video data.

9. The method of claim 7, further comprising:
disabling, by said computer processor in response to said command, said broadcasting, said first audio/video data;
broadcasting in response to said disabling, by said computer processor for said user on said first primary audio/video monitor, said second audio/video data.

10. The method of claim 7, further comprising:
broadcasting in response to said command, by said computer processor for said user on said first primary audio/video monitor, said second audio/video data, wherein said broadcasting said first audio/video data on said first primary audio/video monitor occurs at first time increments during first specified time periods, wherein said broadcasting said second audio/video data on said first primary audio/video monitor occurs at second time increments during second specified time periods, and wherein said first time increments differ from said second time increments.

11. The method of claim 7, further comprising:
broadcasting in response to said command, by said computer processor for said user on a first portion of said first primary audio/video monitor, said second audio/video data, wherein said first audio/video data is broadcasted on a second portion of said first primary audio/video monitor, and wherein said first portion of said first primary audio/video monitor differs from said second portion of said first primary audio/video monitor.

12. The method of claim 1, further comprising:
providing at least one support service for at least one of creating, integrating, hosting, maintaining, and deploying computer-readable code in said computing system, wherein the code in combination with the computing system is capable of performing the method of claim 1.

13. A computer program product, comprising a computer hardware storage device storing a computer readable program code, said computer readable program code configured to perform a method upon being executed by a computer processor of an alert generation computing system, said method comprising:
receiving, by said computer processor from a user, alert data indicating filters for specified alert types associated with possible future events, wherein said specified alert types comprise primary alert types and secondary alert types;
receiving, by said computer processor, monitor definition data indicating primary audio/video monitors and secondary audio/video monitors for broadcasting primary and secondary audio/video data associated with said alert data;
receiving, by said computer processor from a plurality of media sources, media generated audio/video data associated with events currently occurring at different geographical locations;
first comparing, by said computer processor, said alert data to a first portion of said media generated audio/video data;

first determining, by said computer processor, that a first alert type of said specified alert types matches first audio/video data of said first portion of said media generated audio/video data;

second determining, by said computer processor, that said first audio/video data comprises a primary event;

transmitting, by said computer processor to said user, a first notice indicating that said first alert type matches said first audio/video data and that said first audio/video data comprises a primary event; and broadcasting, by said computer processor for said user on a first primary audio/video monitor of said primary audio/video monitors, said first audio/video data.

14. An alert generation computing system comprising a computer processor coupled to a computer-readable memory unit, said memory unit comprising instructions that when executed by the computer processor implements a method comprising:

receiving, by said computer processor from a user, alert data indicating filters for specified alert types associated with possible future events, wherein said specified alert types comprise primary alert types and secondary alert types;

receiving, by said computer processor, monitor definition data indicating primary audio/video monitors and secondary audio/video monitors for broadcasting primary and secondary audio/video data associated with said alert data;

receiving, by said computer processor from a plurality of media sources, media generated audio/video data associated with events currently occurring at different geographical locations;

first comparing, by said computer processor, said alert data to a first portion of said media generated audio/video data;

first determining, by said computer processor, that a first alert type of said specified alert types matches first audio/video data of said first portion of said media generated audio/video data;

second determining, by said computer processor, that said first audio/video data comprises a primary event;

transmitting, by said computer processor to said user, a first notice indicating that said first alert type matches said first audio/video data and that said first audio/video data comprises a primary event; and broadcasting, by said computer processor for said user on a first primary audio/video monitor of said primary audio/video monitors, said first audio/video data.

15. The computing system of claim 14, further comprising:
second comparing, by said computer processor, said alert data to a second portion of said media generated audio/video data;

determining, by said computer processor based on results of said second comparing, that a second alert type of said specified alert types matches second audio/video data of said second portion of said media generated audio/video data;

determining, by said computer processor based on said results of said second comparing and said monitor definition data, that said second audio/video data comprises a secondary event;

transmitting, by said computer processor to said user, a second notice indicating that said second alert type matches said second audio/video data and that said second audio/video data comprises a secondary event; and broadcasting, by said computer processor for said user on a first secondary audio/video monitor of said secondary audio/video monitors, said second audio/video data.

16. The computing system of claim 14, further comprising:
second comparing, by said computer processor, said alert data to a second portion of said media generated audio/video data;

determining, by said computer processor based on results of said second comparing, that said first alert type of said specified alert types matches second audio/video data of said second portion of said media generated audio/video data;

determining, by said computer processor based on said results of said second comparing, that said second audio/video data comprises similar content as said first audio/video data; and disabling, by said computer processor, a broadcast of said second audio/video data.

17. The computing system of claim 16, further comprising:
determining, by said computer processor, that said second audio/video data comprises and said first audio/video data are provided from a same main source.

18. The computing system of claim 14, further comprising:
second comparing, by said computer processor, said alert data to a second portion of said media generated audio/video data;

determining, by said computer processor based on results of said second comparing, that said first alert type of said specified alert types matches second audio/video data of said second portion of said media generated audio/video data;

determining, by said computer processor based on said results of said second comparing and said monitor definition data, that said second audio/video data comprises similar content as said first audio/video data;

determining, by said computer processor based on said results of said second comparing, said monitor definition data, and results of said determining that said second audio/video data comprises similar content as said first audio/video data, that said second audio/video data comprises a secondary event;

transmitting, by said computer processor to said user, a second notice indicating that said second audio/video data comprises a secondary event; and broadcasting, by said computer processor for said user on a first secondary audio/video monitor of said secondary audio/video monitors, said second audio/video data.

19. The computing system of claim 14, further comprising:
second comparing, by said computer processor, said alert data to a second portion of said media generated audio/video data;

determining, by said computer processor based on results of said second comparing, that a second alert type of said specified alert types matches second audio/video data of said second portion of said media generated audio/video data;

determining, by said computer processor based on said results of said second comparing and said monitor definition data, that said second audio/video data comprises a primary event;

transmitting, by said computer processor to said user, a second notice indicating that said second alert type matches said second audio/video data and that said second audio/video data comprises a primary event; and broadcasting, by said computer processor for said user on a second primary audio/video monitor of said primary audio/video monitors, said second audio/video data.

20. The computing system of claim 14, further comprising:
second comparing, by said computer processor, said alert data to a second portion of said media generated audio/video data;
determining, by said computer processor based on results of said second comparing, that a second alert type of said specified alert types matches second audio/video data of said second portion of said media generated audio/video data;
determining, by said computer processor based on said results of said second comparing and said monitor definition data, that said second audio/video data comprises a primary event;
determining, by said computer processor, that there are not any available primary audio/video monitors;
transmitting, by said computer processor to said user, a second notice indicating that there are not any available primary audio/video monitors; and
receiving, by said computer processor from said user in response to said second notice, a command associated with said second notice.

* * * * *